(No Model.)

J. F. STRANGE.
DRILL CHUCK.

No. 362,043. Patented Apr. 26, 1887.

Witnesses
Fred A. Mason
A. C. Fuller

Inventor
John F. Strange
by N. M. Mason atty.

UNITED STATES PATENT OFFICE.

JOHN F. STRANGE, OF NEW BEDFORD, MASSACHUSETTS.

DRILL-CHUCK.

SPECIFICATION forming part of Letters Patent No. 362,043, dated April 26, 1887.

Application filed January 22, 1887. Serial No. 225,057. (No model.)

*To all whom it may concern:*

Be it known that I, JOHN F. STRANGE, a citizen of the United States, residing at New Bedford, in the county of Bristol and State of Massachusetts, have invented a new and useful Improvement in Drill-Chucks, of which the following is a specification.

My invention relates to that class of chucks which are designed to hold drills exclusively, and only that class of drills which have straight shanks—*i. e.*, shanks having parallel sides—and provided with tangs or flattened portions on their rear ends.

The object of my invention is to furnish a simple, durable, and cheap chuck for holding drills, which will avoid the numerous objections to taper-shank drills and the method of holding them, and also avoid the many objections to the method of holding drills which have straight shanks by means of clamping-jaws. I attain these objects by the device illustrated in the accompanying drawings, in which—

Figure 1:
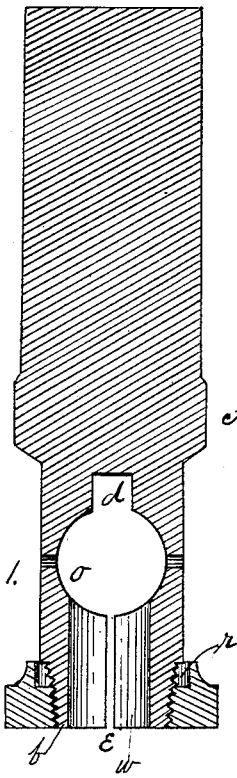
Figure 2:
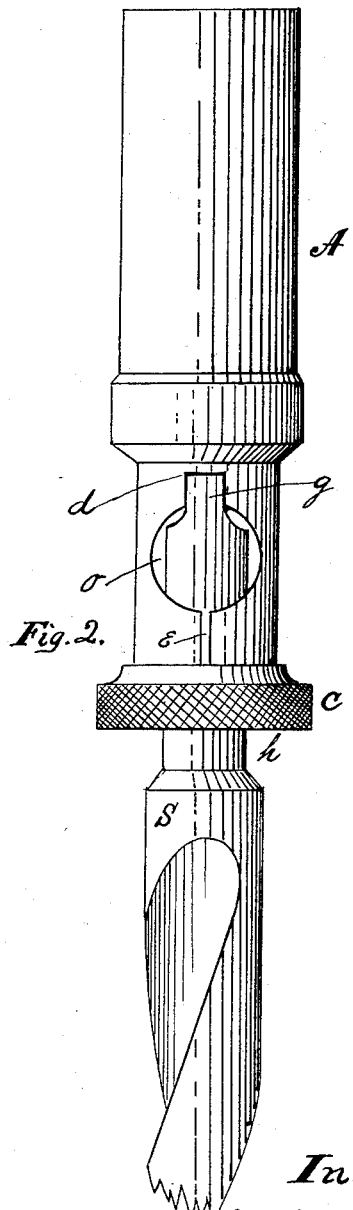

Figure 1 is a view in longitudinal section of my chuck, showing fully the mode of its construction. Fig. 2 is an elevation of the chuck holding a drill.

In Fig. 1, A represents the body of the chuck, through which is drilled laterally the hole *o*. The mortise *d* is then formed in the body of the chuck, connecting with or opening into the hole *o*. The hole *w* is then drilled, connecting with the hole *o*. The end *b* of the chuck is then tapered and screw-threaded and provided with the taper nut *c*. It is then divided into sections by the slits *e*. The shank may be fitted to a lathe-mandrel or to an upright drilling-machine. The drill is driven wholly by the tang or flattened end fitting into the mortise *d*. The divided end *b* of the chuck, when contracted by the taper nut *c* so as to embrace the shank of a drill, only serves to center it and does not in the least help to drive the drill.

A large number of different sizes of drills may be held in this chuck by having their shanks sized down to fit the hole *w*, as is shown in Fig. 2.

Having thus described my invention, what I claim, and desire to secure by Letters Patent, is—

A drill-chuck consisting of elastic jaws formed integrally with the body of the chuck, adapted to be drawn toward each other by means of a taper nut, and having an opening through its body laterally, and provided with a mortise connecting with said opening formed in the body of the chuck, as shown, for the purpose described.

JOHN F. STRANGE.

Witnesses:
 HENRY W. MASON,
 J. C. KNOWLES.